United States Patent [19]
Everett et al.

[11] Patent Number: 5,842,822
[45] Date of Patent: Dec. 1, 1998

[54] REMOVABLE QUASI-RATCHET FASTENER

[75] Inventors: Gerald W. Everett, Normal; Ralph R. Trimnell, Oak Park, both of Ill.

[73] Assignee: Everett Industries Inc, Normal, Ill.

[21] Appl. No.: 857,400

[22] Filed: May 16, 1997

Related U.S. Application Data

[63] Continuation-in-part of Ser. No. 684,945, Jul. 19, 1996, Pat. No. 5,741,102.
[51] Int. Cl.$^6$ .............................. F16B 19/00; F16B 21/00
[52] U.S. Cl. ......................... 411/339; 411/324; 411/510; 411/913
[58] Field of Search ..................... 411/324, 338, 411/339, 508, 509, 510, 514, 913, 907

[56] References Cited

U.S. PATENT DOCUMENTS 4,724,747  2/1988  Sturm et al. ........................ 411/510 X
5,322,402  6/1994  Inoue ........................................ 411/510

FOREIGN PATENT DOCUMENTS 84950  3/1965  France ................................... 411/510

*Primary Examiner*—Neill Wilson
*Attorney, Agent, or Firm*—Don Moyer

[57] ABSTRACT

The new fastener has a shank which is resiliently compressible along an axis perpendicular to the shank push-in axis and has teeth protruding from the shank along the axis of resilient compressibility. The teeth are inclined in the push-in direction and in the pull-out direction. When the shank is pushed into an existing screw hole, then inclines of teeth just past the far side of the screw hole are increased to resist motion in the pull-out direction so that the shank is secured in the screw hole and so that the fastener can be pulled out without damage. The shank is configured to increase the compressibility and to increase the elastic force opposing compression. The shank can be a monolithic part of a first structure fastened to a second structure.

4 Claims, 2 Drawing Sheets

FIG. 5
FIG. 6
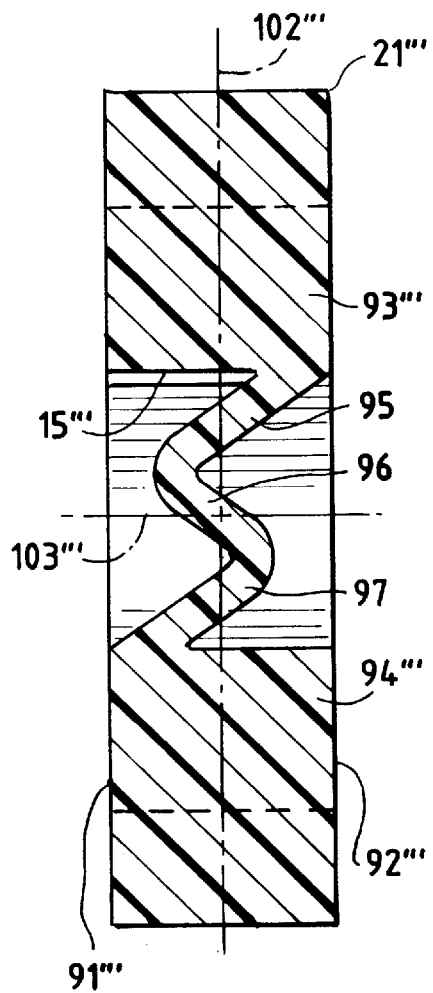
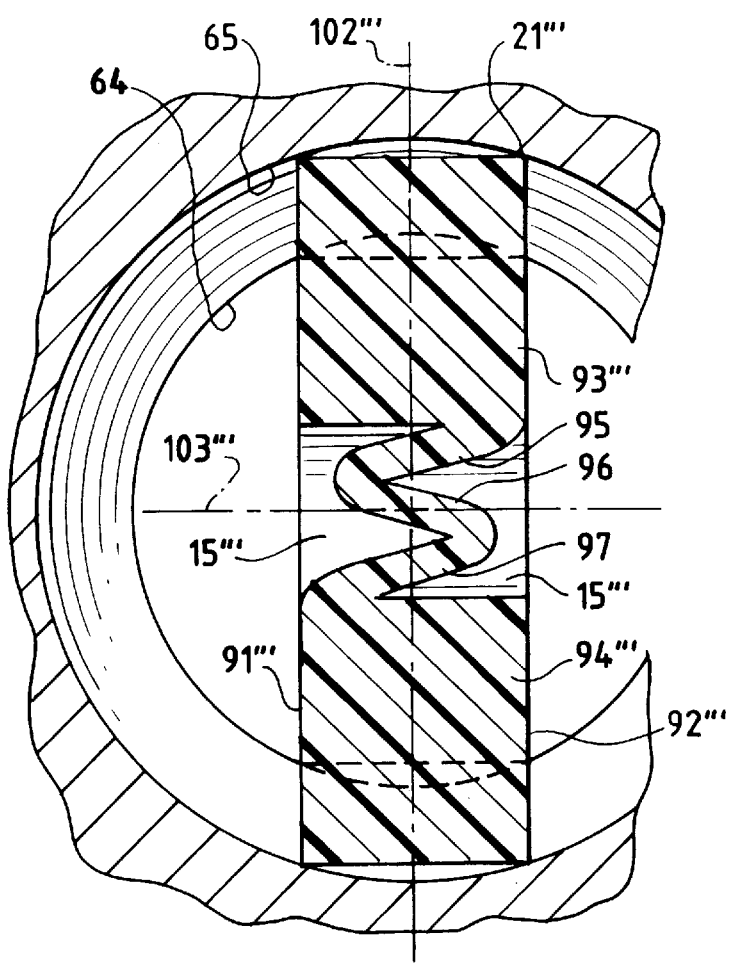

REMOVABLE QUASI-RATCHET FASTENER

RELATED APPLICATIONS

This application is continuation-in-part of U.S. application Ser. No. 08/684,945 for Removable Quasi-Ratchet Fastener filed Jul. 19, 1996 now U.S. Pat. No. 5,741,102.

FEDERAL SPONSOR

NOT APPLICABLE

MICROFICHE APPENDIX

NOT APPLICABLE

BACKGROUND

The invention is a fastener which can be pushed into standard threaded screw holes, which holds securely in part because resilient compression of the fastener increases inclines of teeth to oppose motion in the pull-out direction, and which can be pulled out without damage to the fastener or the screw hole.

There are designs for fasteners which can be pushed from a first structure into a second structure in order to fix the first structure to the second structure. Rapata, in U.S. Pat. No. 2,780,128 shows a circular cross section fastener with barbs pointed toward the pull-out direction. In U.S. Pat. No. 3,272,059 Lyday shows a fastener with barbs pointed toward the pull-out direction and with a hollow push-in end which is intended to give the barbs greater resistance to motion in the pull-out direction. Smith in U.S. Pat. No. 4,867,725 and Strobl in U.S. Pat. No. 4,454,699 show similar devices for special purposes. These devices are not designed to be removable without damage to the fasteners and the structures being fastened.

Improvements in this type of fastener have been suggested in order to maximize forces opposing motion in the pull-out direction. Swick, in U.S. Pat. No. 3,810,279 shows a fastener having wings protruding perpendicularly from the shank with the wings arranged in a cruciform pattern around the shank. Wollar in U.S. Pat. No. 4,396,329 shows ribs added to Swick's wings. Chisholm in U.S. Pat. No. 4,728, 238 shows Swick's wings pointed more acutely in the pull-out direction to increase forces opposing motion in the pull-out direction. In U.S. Pat. No. 4,902,182 Lewis shows abutment stops between the wings to even more greatly increase the forces opposing motion in the pull-out direction. The object of all of these improvements is to have maximum forces opposing motion in the pull-out direction. These devices are not designed to be removed without damage to the fasteners and the structures being fastened.

Other variations of fasteners designed to maximize forces opposing pull-out motion can be found. Examples are Johnson in U.S. Pat. No. 3,115,804, Meyer in U.S. Pat. No. 3,860,999, German Patents 1,553,594 and 2,261,824, and Japanese Patent 2-97,707. Again, none of these suggest a design which would allow easy removal without damage to the fastener and to the structures being fastened.

Some push-in fasteners have been designed so that they can be removed. In U.S. Pat. No. 4,576,532 Hanson shows a fastener which holds very strongly and which can be easily undone when needed. However, it is necessary to access the pushed-in end of this fastener in order to undo the fastener. This is not feasible in most fastening applications.

There are a number of fastening applications where the ease of a push-in fastener is desirable, where it is also desirable to remove the fastener without damaging the fastener or the fastened structures, and where it is not possible to access the pushed-in end of the fastener. For example, electric and telecommunications outlet cover plates need to be secured to the outlet box and also need to be removable, without damage, for various reasons such as in order to make changes in the outlet box and in order to paint the surface around the outlet box.

Some attempts to address this are shown in prior art. Rasmussen in U.S. Pat. No. 3,619,477 shows resilient studs on a special outlet cover plate. The studs fit into special holes in specially designed outlet boxes. In U.S. Pat. No. 3,908, 235 Telliard shows an outlet cover push-in fastener which is removable by use of a special tool. The first device needs special outlet boxes, and the second device needs an easily lost special tool.

Eidson in U.S. Pat. No. 4,534,486 shows various forms of an elastically biased metal prong which is attached to a special outlet cover and which can be inserted into the screw holes of outlet boxes. Adding this metal prong to cover plates accurately and securely enough would be expensive so that this design is not likely to be commercially successful. Also, because forces securing this cover plate are limited, safety questions will arise.

In U.S. Pat. No. 2,506,357 Hamilton shows a clever fastener which can be inserted and removed with ease. Again, the mechanism is complex enough so that applying the mechanism to outlet box covers is not likely to be commercially successful. This mechanism could not be a monolithic part of a cover plate, and the external parts of this mechanism would not be an attractive addition to a cover plate.

Fasteners which are removable and which make use of a resiliently compressible shank can be found in prior art. Examples are shown by Thomson in U.S. Pat. No. 771,336, by Rau in U.S. Pat. No. 1,638,165, and by Siesel in U.S. Pat. No. 2,549,393. Each of these teach at least some rotation to fully insert the fastener so these fasteners could not be made a monolithic part of a cover plate. None of these fasteners, and none of the other prior art fasteners noted above, suggest that the fastener remains resiliently compressed after it is fully inserted so that the resilient compression of the fastener changes the incline of teeth on the fastener in order to increase forces opposing pull-out motion and still allow the fastener to be removed without damage.

SUMMARY

Objects of this invention comprise requirements listed in the following imperatives. Make a fastener which can be pushed into a standard threaded screw hole for securing a first structure to a second structure, such as securing a cover plate to an electric or a telecommunications outlet box. Make a push-in fastener which can be pulled out from the screw hole without special tools and without damage to the fastener or to the structures. Make a push-in, pull-out fastener so that the fastener can be a monolithic part of a first structure, such as a cover plate for an outlet box. Make a push-in, pull-out fastener which has teeth protruding from a shank in a direction perpendicular to the push-in direction, which are inclined in the push-in direction and in the pull-out direction. Make a toothed, push-in, pull-out fastener which is resiliently compressible along the axis along which the teeth protrude so that the pull-out inclines of teeth just through the screw hole increase in order to form quasi-ratchet teeth which increase forces opposing motion in the pull-out direction. Make a quasi-ratchet removable fastener which fastens a first structure to a second structure by several forces opposing motion in the pull-out direction, the several forces comprising: the force required to pull the quasi-ratchet teeth into the screw hole, the elastic force opposing compression of the shank as the teeth are pulled out of thread groves through the screw hole, and friction enhanced by the elastic force of the compressed shank. Make this fastener so that it can be configured to increase the distance that the fastener can be compressed and to increase the elastic force caused by this compression. Make this fastener have low cost and be reliable, easy to manufacture, and easy to use.

Other objects will be comprehended in the drawings and detailed description, which will make additional objects obvious hereafter to persons skilled in the art.

In summary one embodiment of this fastener has a shank which is resiliently compressible in a direction perpendicular to the push-in direction and has teeth protruding along the axis of resilient compressibility, the teeth having inclines toward the push-in direction and toward the pull-out direction.

Other equivalent embodiments will be comprehended in the drawings and detailed description, which will make additional equivalent embodiments obvious hereafter to persons skilled in the art.

DRAWINGS

In the drawings:

FIG. 5 shows the fastener looking down the long axis and shows angle elements in the slot.

FIG. 6 shows the fastener looking down the long axis and shows the angle elements in the slot compressed.

DETAILED DESCRIPTION

Figure 1:
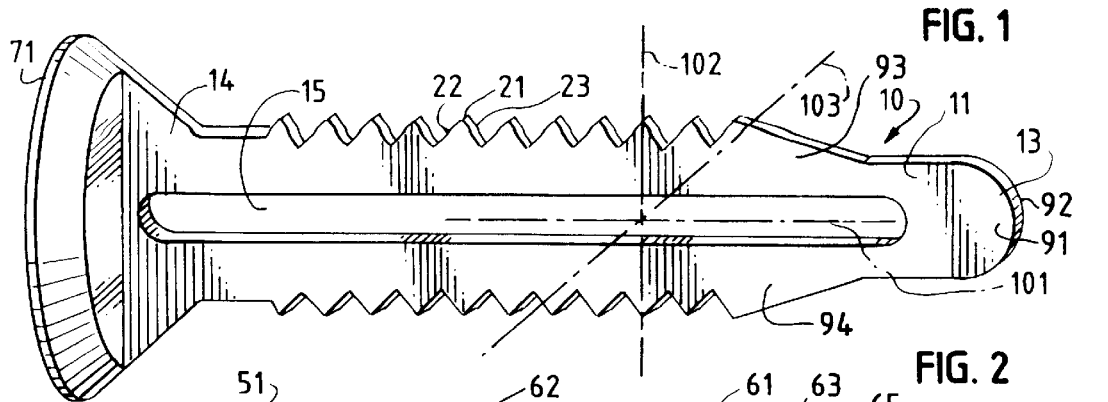
FIG. 1 shows the fastener.

The fastener 10 is shown in FIG. 1. The fastener has a shank 11 which has three orthogonal axes: a long axis 101, a normal axis 102, and a lateral axis 103. The shank 11 has a push-in end 13 on the long axis, and has a pull-out end 14 on the long axis. The shank has a first side 91 and a second side 92, both along the lateral axis. There is a slot 15 through the shank from the shank first side to the shank second side along the shank lateral axis. The slot extends along the long axis between the push-in end and the pull-out end and separates the shank into a first branch 93 and a second branch 94. Teeth 21 protrude from the shank along the normal axis. Each one of the teeth has a pull-out incline 22 and a push-in incline 23. The shank is resiliently compressible along the normal axis, and the slot increases the distance that the shank can be compressed along the normal axis.

Figure 2:
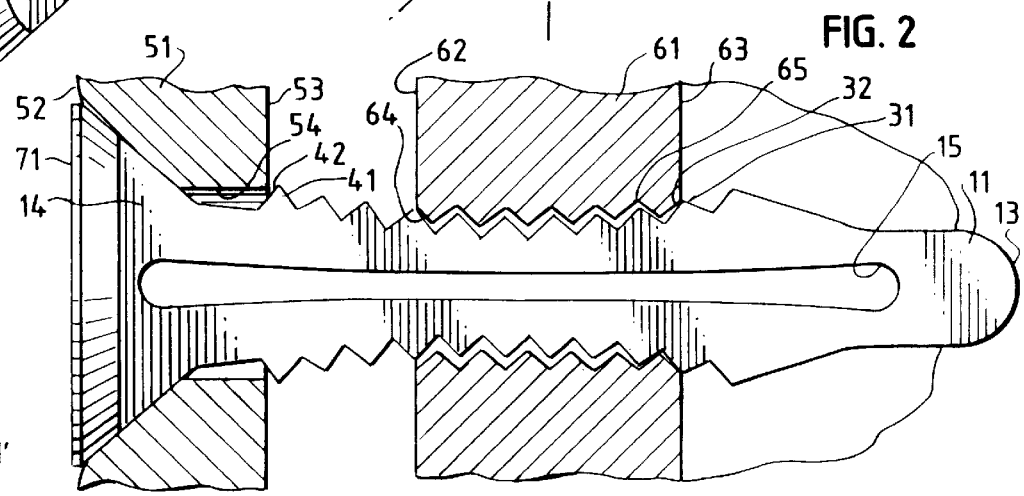
FIG. 2 shows the new fastener securing two structures and shows the quasi-ratchet teeth just past the second structure.

Functions of the fastener are best shown in FIG. 2 where the fastener is shown securing a first structure 51 to a second structure 61. The first structure has an outer side 52, an inner side 53, and an opening 54 from the outer side through to the inner side. The second structure has a near side 62, a far side 63, and an opening from the near side through to the far side. The opening 64 of the second structure is shown to be threaded with thread groves 65. One 31 of the teeth is just past the far side 63 of the second structure.

Because the shank 11 is resiliently compressed by the opening 64 in the second structure, the pull-out incline 32 of the one 31 of the teeth just past the far side is increased toward being perpendicular to the shank long axis. This quasi-ratchet tooth 31 resists motion in the pull-out direction. Motion in the pull-out direction is also opposed by the force required to further compress the shank so that teeth in the thread groves can ride up their pull-out inclines as the shank is pulled out. Also, motion in the pull-out direction is resisted by friction between the surfaces of the teeth and the surfaces of the thread groves, and this friction force is increased by the elastic force acting along the normal axis caused by compression of the shank along the normal axis.

However, unlike a true ratchet—and unlike the various barbs, wings, and other devices which have been used in the art—this quasi-ratchet fastener is designed so that it can be pulled out without damaging any of the fastener, the first structure, and the second structure and thus can be reused. Removing this fastener without damage is analogous to removing a typical screw without damage, and reusing this fastener is analogous to reusing a typical screw. This quasi-ratchet fastener is designed so that the force required to move the fastener in the pull-out direction is great enough to secure structures, such as an electric outlet box cover plate, in normal use. As well, this quasi-ratchet fastener is designed so there is enough incline left at the quasi-ratchet tooth 31 and enough compressibility left in the shank so that the fastener can be removed without damaging the fastener or the structures secured. The quasi-ratchet fastener is devised so that using the fastener—for example to repeatedly secure, remove, and re-secure an electric outlet box cover plate—is analogous to using a typical screw to repeatedly secure, remove, and re-secure the cover plate.

This quasi-ratchet function depends on the distance that the shank can be compressed along the normal axis and depends on the elastic force acting along the normal axis caused by compression of the shank along the normal axis. Thus the fastener is devised so that the shank can be configured to increase the distance that the shank can be compressed along the normal axis. The preferred configuration for increasing this distance is the slot 15. The fastener is also devised so that the shank can be configured to increase the elastic force acting along the normal axis caused by the compression of the shank along the normal axis An elastic element separating the shank first branch and the shank second branch can be added in the slot to increase the elastic force acting along the normal axis caused by compression of the shank along the normal axis. For example, an alternate form for the slot, shown looking down the long axis and across the normal axis 102''' and across the lateral axis 103''' in FIG. 5 and FIG. 6, does increase this elastic force. Here the slot 15''' does not go fully through from the first side 91''' to the second side 92''' but is configured have an elastic element separating the slot first branch 93''' and the shank second branch 94''' and increasing the elastic force which can act along the normal axis. A first angle element 95 connected to the shank first branch 93''' at the shank second side 92''' angles toward the shank first side 91''' and toward the shank second branch 94'''. A second angle element 97 connected to the shank second branch 94''' at the shank first side 91''' angles toward the shank second side 92''' and toward the shank first branch 93'''. A third angle element 96 connects the first angle element to the second angle element. In FIG. 6 the shank is shown inserted into the opening 64 with one of the teeth shown 21''' in one of the groves 65. When the shank, with this slot configuration, is inserted in the opening 64, then the angle elements are bent, causing the elastic force acting along the normal axis to increase as the compression along the normal axis is increased.

These three angle elements are one example of configuring the shank by adding an elastic element separating the shank branches to increase the elastic force acting along the shank normal axis caused by compression of the shank along the shank normal axis. The elastic element shown is a monolithic part of the shank. Equivalently the elastic element could be made of material different from the material of the shank and attached in the slot. The slot could have an elastic element throughout the slot full length, and the slot could have an elastic element in only a part of the slot full length. Various elastic elements formed by various configurations of the slot, and alternatively by variously configured elements attached in the slot, which would be equivalent means for increasing the elastic force acting along the normal axis caused by compression of the shank along the normal axis, will be obvious hereafter to people skilled in the art.

Figure 3:
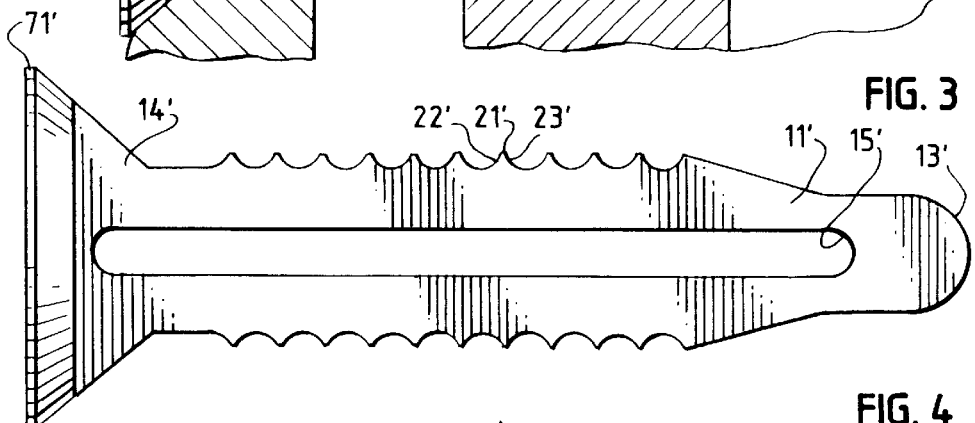
FIG. 3 shows an alternative form for the fastener teeth.

In FIG. 1 the pull-out incline 22 and the push incline 23 are shown to be planar. Other forms can provide the same functions. For example, FIG. 3 shows a shank 11' having a push in end 13', a pull-out end 14', and a slot 15' all generally identical to their counterparts in FIG. 1, but has teeth 21', which have a pull-out incline 22' and a push-in incline 23' both of which are arcuate.

The fastener is designed to work with existing structures such as an electric outlet box and cover plate. Thus the fastener works with threaded openings like the opening 64 in the second structure shown in FIG. 2. The fastener will also work with openings which are not threaded inasmuch as the opening compresses the shank 11 enough to increase the pull-out incline 32 of a quasi-ratchet tooth 31, and the resilient compression of the shank increases friction, to oppose pull-out motion sufficiently to meet requirements of the application. The new fastener will also work when the fastener does not go all the way through a threaded opening inasmuch as the forces opposing pull-out motion are sufficient to meet the requirements of the application.

Often it is desirable to have a fastener secured in a first structure just enough so that the fastener does not fall away as the first structure is positioned for being secured to a second structure. FIG. 2 shows that fall-out motion of the shank from the opening 54 in the first structure 51 is opposed by the force needed to further compress the shank in order for the pull-out incline 42 of one of the teeth 41 just inner side 53 the first structure to move into the opening 54.

The pull-out inclines 22, and alternatively 22', are shown to be generally equal to the push-in inclines 23, and alternatively 23', but they need not be the same. The slopes of the pull-out inclines can be different from the slopes of the push-in inclines. The pull-out and the push-in inclines can vary in slope, and can vary in planar and arcuate forms, from one to another of the teeth. For example, the pull-out inclines of the teeth which are closest to the pull-out end can be increased to facilitate securing the fastener in a first structure just enough so that it does not fall away as the first structure is being positioned for being secured to a second structure.

Figure 4:
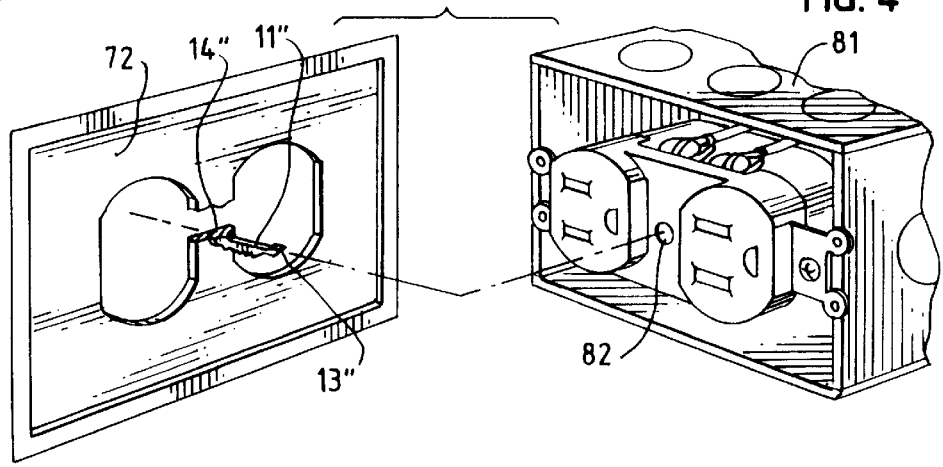
FIG. 4 shows the fastener as a monolithic part of a cover plate and shows how the fastener can removably secure the cover plate to an electric outlet box.

The shank pull-out end 14 and 14' can terminate with a head 71 and 71' in order to stop motion of the shank through the opening 54 through the first structure, so that the first structure 51 can be secured to the second structure 61 as is shown in FIG. 2. In addition, this shank is deliberately devised so that the shank can be pulled out without damage with the intention of making the shank a fixed part, and even a monolithic part, of the first structure. This is shown in FIG. 4. Here the shank 11" pull-out end 14" is a monolithic part of a cover plate 72 for an outlet box 81. The shank push-in end 13" can be inserted into the existing screw hole 82 in the existing outlet box 81.

Thus the shank secures cover plates to existing outlet boxes so that the cover plate can be removed without damage to the combined cover plate and fastener and without damage to the box. This saves steps in work with cover plates and the saved steps will accumulate to large savings in time and cost. Making the cover plate and fastener monolithically of one material also saves costs. And, this cover plate with monolithic fastener will have an outer side unencumbered by the usual screw head, which will offer greater opportunities for ornamental design on the cover plate.

Other equivalent forms for the teeth and other equivalent means for increasing the resilient compressibility of the shank will be obvious hereafter to persons skilled in the art. Therefore this invention is not limited to the particular examples shown and described here.

I claim:

1. A fastener comprising:

a shank the shank having a long axis, a lateral axis, and a normal axis, the shank having a push-in end on the shank long axis, the shank having a pull-out end on the shank long axis, the shank pull-out end terminating with a head, the head for stopping motion of the shank through a first structure, the shank being compressible along the normal axis, and the shank having an elastic force acting along the normal axis caused by compression of the shank along the normal axis;

a slot in the shank along the shank lateral axis and extending along the shank long axis between the shank pull-out end and the shank push-in end, the slot partitioning the shank into a first branch and a second branch, the slot for increasing the distance that the shank can be compressed along the shank normal axis;

an elastic element, the elastic element separating the shank first branch and the shank second branch, the elastic element for increasing the elastic force acting along the shank normal axis caused by compression of the shank along the shank normal axis and;

teeth, the teeth protruding from the shank along the shank normal axis, each one of the teeth having a push-in incline, and each one of the teeth having a pull-out incline, the push-in incline causing a compression of the shank while the shank is being inserted from the first structure into an opening in a second structure, the compression allowing the shank to be fully inserted from the first structure into the opening without any rotation of the shank, the teeth causing a continuing compression of the shank while the shank remains fully inserted in the second structure, the elastic force caused by the continuing compression resisting motion in the pull-out direction, the elastic force caused by the continuing compression increasing the pull-out incline of at least one of the teeth which is just through the opening in the second structure, the increased pull-out incline resisting motion out of the opening, the increased pull-out incline and the shank compressibility allowing the shank to be pulled out of the opening without damage to any of the shank, the teeth, and the second structure.

2. The fastener of claim 1 wherein the teeth fit into screw thread groves.

3. A fastener comprising:

a shank, the shank having a long axis, a lateral axis, and a normal axis, the shank having a push-in end on the shank long axis, the shank having a pull-out end on the shank long axis, the shank being compressible along the normal axis, the shank having an elastic force acting along the normal axis caused by compression of the shank along the normal axis, and the shank being fixedly part of a first structure;

teeth, the teeth protruding from the shank along the shank normal axis, each one of the teeth having a push-in incline, and each one of the teeth having a pull-out incline, the push-in incline causing a compression of the shank while the shank is being inserted from the first structure into an opening in a second structure, the compression allowing the shank to be fully inserted from the first structure into the opening without any rotation of the shank, the teeth causing a continuing compression while the shank remains fully inserted in the second structure, the elastic force caused by the continuing compression resisting motion in the pull-out direction, the elastic force caused by the continuing compression increasing the pull-out incline of at least one of the teeth which is just through the opening in the second structure, the increased pull-out incline resisting motion out of the opening, the increased pull-out incline and the shank compressibility allowing the shank to be pulled out of the opening without damage to any of the shank, the teeth, and the second structure;

a slot, the slot being in the shank along the shank lateral axis and extending along the shank long axis between the shank pull-out end and the shank push-in end, the slot partitioning the shank into a first branch and a second branch, the slot for increasing the distance which the shank can be compressed along the shank normal axis; and an elastic element, the elastic element separating the shank first branch and the shank second branch, the elastic element for increasing the elastic force acting along the shank normal axis caused by compression of the shank along the shank normal axis.

4. The fastener of claim 3 wherein the teeth fit into screw thread groves.

* * * * *